United States Patent [19]
Janitzki

[11] Patent Number: 5,882,152
[45] Date of Patent: Mar. 16, 1999

[54] MULTI-BIT DRILL

[76] Inventor: Bernhard M. Janitzki, 51 Poniente 1110, Puebla, Puebla, Mexico, 72430

[21] Appl. No.: 871,393

[22] Filed: Jun. 9, 1997

[51] Int. Cl.$^6$ ..................................................... B23B 27/14
[52] U.S. Cl. ........................... 408/144; 407/32; 408/200; 408/215; 408/224; 408/234 R; 408/712
[58] Field of Search ................................. 408/200, 230, 408/144, 223, 224, 227, 712, 149, 215, 228, 219, 234 R; 407/32, 119, 113

[56] References Cited

U.S. PATENT DOCUMENTS

| | | | |
|---|---|---|---|
| 224,921 | 2/1880 | Kenworthy | 408/219 |
| 1,111,413 | 9/1914 | Smith | 408/219 |
| 1,133,162 | 3/1915 | McAllister . | |
| 1,163,867 | 12/1915 | Shaffer . | |
| 1,345,425 | 7/1920 | Wells | 408/219 |
| 1,826,323 | 10/1931 | Mueller | 408/219 |
| 2,312,176 | 2/1943 | Kotowski . | |
| 4,230,193 | 10/1980 | Logan, Jr. . | |
| 4,230,194 | 10/1980 | Logan, Jr. . | |
| 4,507,028 | 3/1985 | Matsushita . | |
| 4,655,661 | 4/1987 | Brandt | 408/224 |
| 5,046,905 | 9/1991 | Piacenti et al. | 408/224 |
| 5,597,272 | 1/1997 | Moriguchi et al. | 408/144 |

*Primary Examiner*—Daniel W. Howell
*Assistant Examiner*—Adesh Bhargava
*Attorney, Agent, or Firm*—Paul M. Denk

[57] ABSTRACT

A drill having an elongated body including a fluted land and a shank. The fluted land includes a plurality of radial grooves of reduced material thickness formed therein to the depth of the flutes. The grooves define discrete segments of the drill. Each segment has a facet which has the relief of a drill tip so that when the exposed drill tip becomes dull, the segment can be broken off at the notch exposing a successive, sharp drill tip. The drill can have the cutting edges coated with an appropriate protective material such as TiN, titanium nitride, titanium carbide, titanium carbonitride or any other appropriate coating material to improve cutting and preserve the edge.

9 Claims, 1 Drawing Sheet

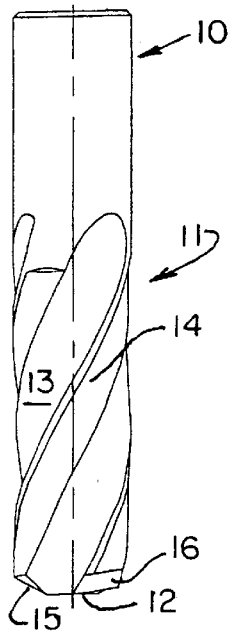
FIG. 1
PRIOR ART
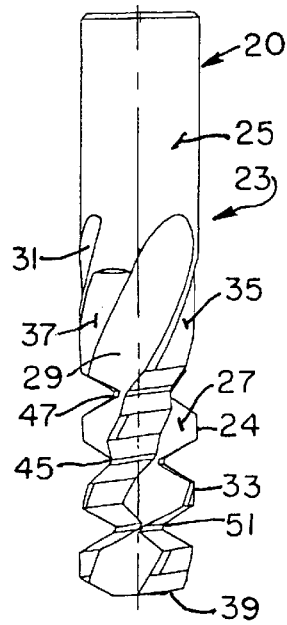
FIG. 2
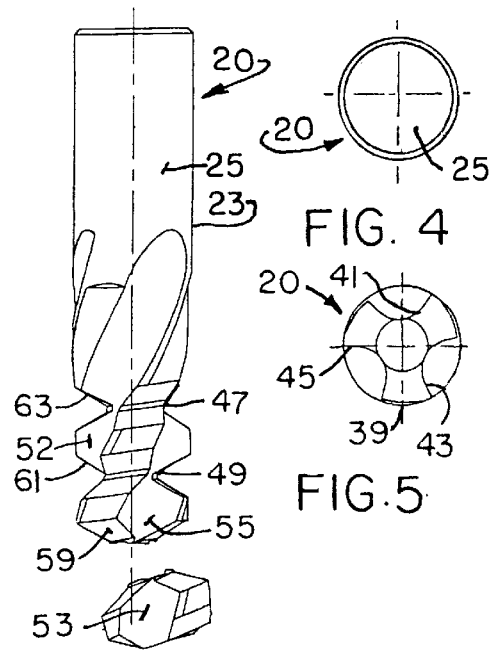
FIG. 3
FIG. 4
FIG. 5
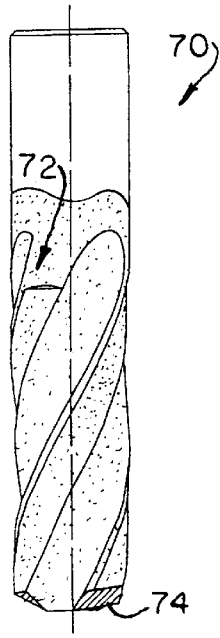
FIG. 6
PRIOR ART
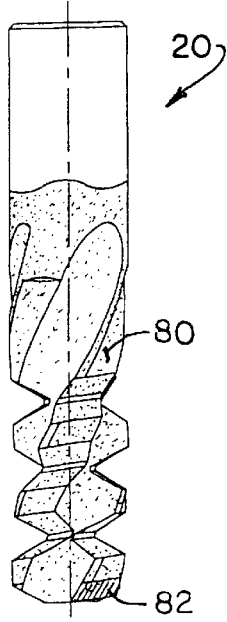
FIG. 7
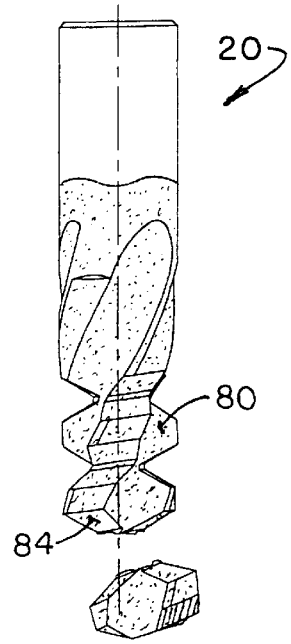
FIG. 8

MULTI-BIT DRILL

BACKGROUND OF THE INVENTION

The invention relates generally to drills and, more specifically, to multi-bit drill that provides successes sharp drill tips throughout the use.

Drills and drill bits are common to the art. Generally, drills are used to create holes in solid objects, commonly wood or metal. In metalworking, drills are used to make initial holes ranging from 0 to 5/16 inch. Diameters above 5/16 inch usually are made in a second operation, enlarging the predrilled pilot hole. For example, if the craftsman wants to drill a 9/16 inch hole, he would use a 5/16 inch drill for the first operation and then drill the 9/16 inch hole. Thus, the 9/16 inch drill would cut 1/8 inch per each cutting edge.

A typical prior art twist drill, shown as 10 in FIG. 1, normally has a fluted land 11 comprising tip 12 and only two cutting edges 14 and 16 with corresponding two flutes 17 and 18 to accommodate the chips. If there is need for a more accurate holes, two-fluted drills do not do a very precise job. To make a more precise hole, core drills are used. A core drill typically includes three or more flutes, and provide better accuracy and a better finish. FIG. 1 illustrates a standard, prior art, three-fluted core drill. FIG. 6 illustrates a prior art, three-fluted twist drill having a coating of tin.

Prior art drills, both two-fluted drills and three or four-fluted core drills, must remain sharp to perform well. Sharpening an ordinary two-fluted drill up to ½ inch, for example, is possible on a bench grinder, but requires the skill of an experienced craftsman to do a good job. Many drill users, for example home users or "do-it yourselfers" who do not have the tools or the skill to sharpen drills. Since these users cannot restore the cutting edge of the drill, the drill life is short. Thus, the user employs low cost drills which are discarded when they become dull. This makes economic sense, however, the low cost drills also lack in performance.

Further, most high quality drills have a surface treatment of nitride case, black oxide or tin. A premium tin coated drill may have 400% greater performance than an untreated drill. However, after a first grind to sharpen the drill, the surface treatment at the cutting edge is removed.

Also, the drill manufacturing industry is employing more exotic materials, for example carbide and ceramic, for making drills which are hard to machine and sharpen.

It would be advantageous, therefore, to provide a drill that creates a precise finished hole and maintains a sharpened, preferably coated, cutting edge.

SUMMARY OF THE INVENTION

It is among the general objects of the present invention to provide a drill that maintains a sharpened cutting edge throughout continued use.

It is another object of the present invention to provide such a drill wherein the sharpened cutting edge can be coated.

Still another object of the present invention is to provide such a drill that has a cutting tip that can break off and expose another sharp cutting tip, Another object of the present invention is to provide such a drill wherein the drill includes segments defined by a series of radial notches formed along the axial length the drill, the face of each notch having the relief of a drill tip.

Yet another object of the present invention is to provide such a drill wherein the segments of the drill can be broken off thereby exposing the next segment having a drill tip.

In accordance with the invention a drill is provided having an elongated body. The body includes at least on flute about the axial length. The drill includes a plurality of radial notches formed in the body almost to the depth of the flute. The notches define discrete segments of the drill. Each segment has a face which has the relief of a drill tip. The drill can have the cutting edges coated with an appropriate material such as tin. The drill is used to bore holes in the same manner as any conventional drill. However, when the exposed drill tip becomes dull, the tip can be broken off at the notch, thereby exposing a successive, sharp drill tip. The cutting edges of the drill can be coated in TiN, titanium nitride, titanium carbide, titanium carbonitride or any other appropriate coating material to improve cutting and preserve the edge.

BRIEF DESCRIPTION OF THE DRAWINGS

FIG. 1 is a front elevational view of a prior art core drill:

FIG. 2 is a front elevational view of the drill of the present invention;

FIG. 3 is a front elevational view of the drill of FIG. 2 with a tip segment removed;

FIG. 4 is an shank end plan of the drill of FIG. 2;

FIG. 5 is a tip end plan of the drill of FIG. 2;

FIG. 6 is a front elevational view of a prior art core drill with a protective coating;

FIG. 7 is a front elevational view of the drill of the present invention with a protective coating;

FIG. 8 is a front elevational view of the drill of FIG. 7 with a tip segment removed;

Corresponding reference numerals indicate corresponding structures throughout the various figures.

DESCRIPTION OF THE PREFERRED EMBODIMENT

The twist drill of the present invention is indicated generally by reference numeral 20 in the FIGS. 2–5. A better appreciation of the novel aspects of drill 20 can be gained by comparing drill 20 with the prior art drill, indicated by reference numeral 10 in FIG. 1. As will be appreciated by those skilled in the art, the prior art drill 10 includes an elongated body 11 comprising a fluted land 12 having three flutes, as at 13 and corresponding lands 14. As previously mentioned, drill 10 includes a tip 12 with cutting edges as at 15, 16.

The drill 20 of the present invention includes a body 22 having a typical solid body 23 comprising a fluted land 24 and a shank 25 for mounting in a drive tool. The fluted land includes flutes 27, 29, 31, lands 33, 35, and 37 and a cutting tip 39 at the end. As can be seen from FIG. 5, the tip has a plurality of cutting edges 41, 43 and 45 and which correspond with the flutes. A best seen in FIGS. 2 and 3, drill 20 includes a plurality of radial or circumferential grooves 47, 49, 51 evenly space along the axial length of the fluted land between the cutting tip 39 and the shank. The grooves 47–51 are machined or otherwise formed in the body resulting in a reduced material thickness in the body. In the preferred embodiment, the grooves are cut into the body to a depth approximately the depth of the flutes. Thus, the reduced material thickness extends around the circumference of the body at each groove. The grooves 47, 49, 51 divide the body into discrete segments 53, 55 and 57. It will be appreciated that grooves 47, 49, 51 have facets 59, 61 and 63 which are disposed toward the cutting tip. The facets 59, 61 and 63 have a relief or surface configuration the same as or similar to cutting tip 39.

The novel design of drill 20 allows the user to have successive sharp cutting tips as will now be described. As shown in FIG. 4, in use, a segment, such as segment 53, can be removed, for example by breaking off the segment. This can be accomplished because, as stated above, the drill body has a reduced material thickness at the grooves. By breaking off a segment, the user exposes a relief, such as facet 59, which now functions as the sharp cutting tip. If and when facet 59 becomes dulled by wear, segment 55 can be removed exposing facet 61 to function as the cutting tip. It will be appreciated that, although the illustrated drill includes only three discrete segments, the drill of the present invention can be machined with as many grooves and discrete segments as practical and functional.

Further, in accordance with the present invention, drill 20 can be coated with a coating such as TiN, titanium nitride, titanium carbide, titanium carbonitride or any other appropriate coating material to improve cutting and preserve the edge, as will now be described. FIG. 6 illustrates a prior art twist drill 70 having a coating, indicated generally by reference numeral 72. It will be appreciated that since the exposed cutting edge or facet 74 receives the abrasion and wear of drilling, and is worn off. FIGS. 7 and 8 illustrate the drill of the present invention, having a coating, indicated generally at 80. As can be appreciated as the coating is worn off the tip as at 82, the coating will remain on the succeeding facets, as at 84 Thus, removal of a segment, shown in FIG. 8. will expose a sharp cutting tip with coating, for continued use. The functional life of the drill is thereby extended. Exposing each successive cutting tip is equivalent to employing a new drill.

It will be appreciated that changes and modifications may be made in the drill of the present invention without departing from the scope of the appended claims. Therefore, the foregoing description and accompanying drawings are intended to be illustrative only, and should not be viewed in a limiting sense.

I claim:

1. A drill comprising:

an elongated cylindrical body having a first end and a second end;

an elongated, cylindrical mounting means at said second end;

cutting means at said first end;

at least one flute means formed in said body and extending from said cutting means toward said mounting means;

at least one circumferential groove formed in said body between said cutting means and said mounting means, said groove creating a reduced material thickness in said body at said groove and defining at least one discrete segment of body;

said at least one circumferential groove having at least one facet disposed downwardly towards said first end, said facet comprising at least a second cutting means, whereby said at least one discrete segment of body can be horizontly removed from the drill at said at least one circumferential groove thereby downwardly exposing said at least second cutting means.

2. The drill of claim 1 comprising a plurality of circumferential grooves defining a plurality of discrete segments of said body.

3. The drill of claim 1 wherein the drill is coated with a material to increase a hardness of said drill.

4. The drill of claim 3 wherein the coating material is selected from the group comprising tin, titanium nitride, titanium carbide, and titanium carbonitride.

5. A segmented drill comprising:

an elongated body having a first end and a second end and a cylindrical material thickness therebetween;

a cutting means at said first end;

said body having at least one elongated groove formed therein extending in a substantially twisted pattern from said cutting means along the axial length of said body toward said second end, said groove reducing the material thickness of said body thereby forming a flute;

said body having a series of circumferential grooves formed therein between said first end and said second end, said grooves reducing the material thickness of said body and defining a series of discreet, horizontally removable segments of body from said first end to said second end;

each said groove comprising at least one facet disposed downwardly toward said first end, each said facet comprising a cutting means;

each said discrete segment, when removed, exposing a downwardly directed facet and cutting means of a subsequent circumferential groove in said series of circumferential grooves.

6. The drill of claim 5 further comprising a coating selected from the group comprising tin, titanium nitride, titanium carbide, and titanium carbonitride.

7. A segmented twist drill comprising:

a body including a fluted land and a shank;

a cutting tip on said fluted land, a plurality of flutes extending the axial length of the fluted land from the cutting tip to the shank;

a plurality of circumferential grooves spaced along the axial length of the fluted land, said grooves creating a reduced material thickness of the fluted land at the groove and defining discrete segments of fluted land, each said segment having a cutting facet thereon disposed downwardly towards said cutting tip, said segments being removable at the reduced material thickness thereby exposing a successive downwardly cutting facets directed.

8. The drill of claim 7 wherein the fluted land further comprises a coating of wear resistant material.

9. The drill of claim 8 wherein the wear resistant material is selected from the group comprising TiN, titanium nitride, titanium carbide, and titanium carbonitride.

* * * * *

UNITED STATES PATENT AND TRADEMARK OFFICE
CERTIFICATE OF CORRECTION

PATENT NO.   : 5,882,152
DATED        : March 16, 1999
INVENTOR(S)  : Janitzki, B.M.

It is certified that error appears in the above-identified patent and that said Letters Patent is hereby corrected as shown below:

Column 4, claim 7, line 48, after "successive downwardly" insert ---directed---; line 49, delete "directed".

Signed and Sealed this

Thirty-first Day of August, 1999

Q. TODD DICKINSON

*Attest:*

*Attesting Officer*      *Acting Commissioner of Patents and Trademarks*